(No Model.)
J. HUTCHISON.
MOUNTING AND DRIVING BOLTING REELS.
No. 573,412. Patented Dec. 15, 1896.
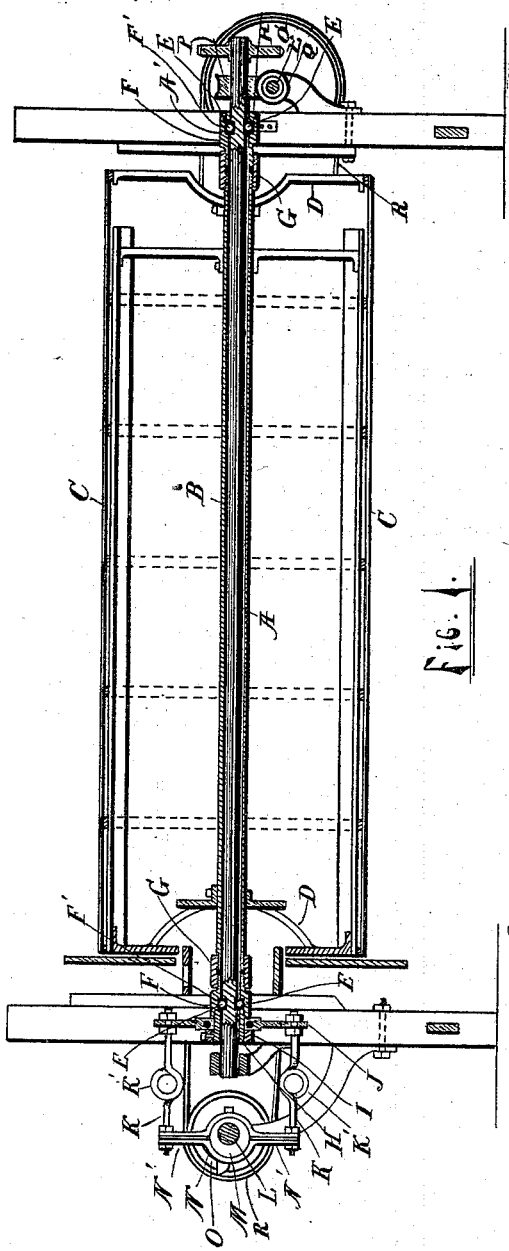
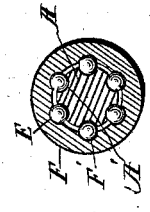
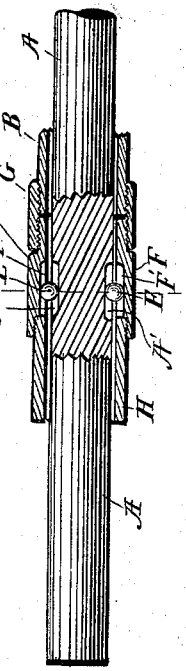
Witnesses.
Lotta C. Buck
Lois Moulton
Inventor.
John Hutchison
By Moulton & Flanders,
Attorneys

UNITED STATES PATENT OFFICE.

JOHN HUTCHISON, OF JACKSON, MICHIGAN.

MOUNTING AND DRIVING BOLTING-REELS.

SPECIFICATION forming part of Letters Patent No. 573,412, dated December 15, 1896.

Application filed July 6, 1896. Serial No. 598,163. (No model.)

*To all whom it may concern:*

Be it known that I, JOHN HUTCHISON, a citizen of the United States, residing at Jackson, in the county of Jackson and State of Michigan, have invented certain new and useful Improvements in Mounting and Driving Bolting-Reels, Sand-Drums, &c.; and I do hereby declare the following to be a full, clear, and exact description of the invention, such as will enable others skilled in the art to which it appertains to make and use the same.

My invention relates to improvements in the mechanism for imparting motion to a bolting-reel, sand-drum, or other body having a combined rotary motion about its axis and a reciprocating motion in the line of the same; and I accomplish this object by means hereinafter more fully described, and particularly pointed out in the claims, reference being had to the accompanying drawings, in which—

Figure 1 is a longitudinal vertical section of my improved device with a bolting-reel attached; Fig. 2, a detail in longitudinal section illustrating the ball-bearing connecting the rotating shaft and vibrating sleeve, and Fig. 3 a transverse section on the line 3 3 of Fig. 2.

Like letters refer to like parts in all of the figures.

A represents a shaft journaled in any suitable bearings and rotated in any convenient way. In the case of a bolting-reel I prefer a worm-gear P, engaged by a screw Q, mounted on a shaft L, suitably journaled and driven by pulleys O O' and belt R, actuated by the driving-shaft L of the machine. The shaft A is provided with a circumferential series of longitudinal grooves A' at such intervals as may be necessary, and surrounding said shaft is a tube or sleeve B of somewhat larger internal diameter than the outside of said shaft, and opposite each series of grooves A' in the shaft said sleeve is provided with ball-casings F, having substantially the same internal diameter as the sleeve and provided with a series of longitudinal grooves F', corresponding to and opposing the grooves A' in the shaft. In each of these opposing grooves in the casing and shaft are placed one or more balls E, which balls thus movably connect the shaft and sleeve, whereby the sleeve may be moved freely longitudinally upon the shaft, being supported solely upon the balls, and said balls also serve as keys to cause the sleeve to rotate with the shaft. The casing F is closed at one end by the end of a sleeve-section H, screwed or otherwise secured within the same, and the other end of said casing may be reduced, provided with a male thread, and connected to the next sleeve-section by a coupling G.

To impart longitudinal vibratory motion to the sleeve B, various known devices may be utilized, but I prefer a yoke J, having diverging arms and rotative on said sleeve, and engaged by the ball-casing at one side and a collar I at the other side. To this yoke is attached connecting-rods K, having spring-coils K' to relieve the shock of the inertia of said sleeve and supported parts. Said rods are actuated by an eccentric M on the driving-shaft L, said eccentric having a strap N, provided with arms N', attached to said connecting-rods.

C represents (for illustration only) a bolting-reel attached to the sleeve B by means of suitable spiders D D. A sanding-drum or any other body to which the described motion of the sleeve B is to be imparted may be attached to the same as occasion required and the relative speed of vibration and rotation of the shaft A and sleeve B varied according to circumstances by changing the proportions of the transmitting mechanism connecting the shafts L and L' without departing from the spirit of my invention.

In case of a bolting-reel the rotary motion would be relatively slow and the vibration rapid, while in case of a sand-drum the reverse would be the best arrangement.

Having thus fully described my invention, what I claim is—

1. The combination of a rotative shaft, having longitudinal grooves, a sleeve surrounding said shaft, having corresponding grooves and balls in said grooves, movably connecting said shaft and sleeve, substantially as described.

2. The combination of a shaft, having a circumferential series of longitudinal grooves, a sleeve having internal grooves opposite the grooves in the shaft, balls in said grooves connecting said sleeve and shaft, and mechanism for rotating said shaft, and vibrating said sleeve, substantially as described.

3. The combination of a shaft having a circumferential series of grooves, a sleeve surrounding said shaft, a ball-case connected to said sleeve, and having grooves opposite the groove in said shaft, balls in said grooves connecting said sleeve and shaft and a sleeve-section inserted in the end of said ball-case, substantially as described.

4. The combination of a shaft, a sleeve longitudinally movable on said shaft and rotating therewith, a cylindrical body mounted upon and wholly supported by said sleeve, and means for rotating said shaft and vibrating said sleeve on the same, substantially as described.

5. The combination of a shaft, having one or more circumferential longitudinal grooves, a sleeve having corresponding internal grooves, balls in said grooves connecting the sleeve and shaft, a driving-shaft, an eccentric on said shaft, a yoke rotative on said sleeve, a strap on said eccentric, rods, having spring-coils connecting said strap and yoke, a worm-gear on said first-named shaft, a counter-shaft having a worm engaging said gear, and pulleys and a belt connecting said counter-shaft and driving-shaft, substantially as described.

In testimony whereof I affix my signature in presence of two witnesses.

JOHN HUTCHISON.

Witnesses:
LUTHER V. MOULTON,
WILLIAM A. REYNOLDS.